United States Patent [19]

Greenberg

[11] 4,357,624
[45] Nov. 2, 1982

[54] INTERACTIVE VIDEO PRODUCTION SYSTEM

[75] Inventor: George A. Greenberg, Los Angeles, Calif.

[73] Assignee: Combined Logic Company, Beverly Hills, Calif.

[21] Appl. No.: 246,014

[22] Filed: Mar. 20, 1981

Related U.S. Application Data

[63] Continuation-in-part of Ser. No. 39,184, May 15, 1979, Pat. No. 4,258,385.

[51] Int. Cl.³ .......................................... H04N 9/535
[52] U.S. Cl. ...................................... 358/22; 358/80; 358/311; 358/327
[58] Field of Search .................... 358/4, 8, 22, 30, 78, 358/80, 81, 82, 54

[56] References Cited

U.S. PATENT DOCUMENTS

| Re. 29,787 | 9/1978 | Bargen | 358/4 |
|---|---|---|---|
| 3,512,094 | 5/1970 | Dann | 358/4 |
| 3,617,626 | 11/1971 | Bluth | 358/4 |
| 3,717,725 | 2/1973 | Numakara | 358/4 |
| 3,739,078 | 6/1973 | Pugsley | 358/80 |
| 3,835,245 | 9/1974 | Pieters | 358/93 |
| 3,899,662 | 8/1975 | Kregger | 358/903 |
| 3,904,816 | 9/1975 | Taudt | 358/80 |
| 3,949,416 | 4/1976 | Stalley | 358/8 |
| 3,969,757 | 7/1976 | Amery | 358/4 |
| 3,997,912 | 12/1976 | Zsagar | 358/78 |
| 4,000,510 | 12/1976 | Cheney | 358/903 |
| 4,017,680 | 4/1977 | Anderson | 358/903 |
| 4,026,555 | 5/1977 | Kirschner | 273/85 R |
| 4,060,829 | 11/1977 | Sakamoto | 358/80 |
| 4,096,523 | 6/1978 | Belmares-Sarabia | 358/80 |
| 4,122,489 | 10/1978 | Bolger | 358/8 |
| 4,266,242 | 5/1981 | McCoy | 358/22 |

OTHER PUBLICATIONS

Comtal-Vision ONE/20, author unknown, date unknown.

*Primary Examiner*—Michael A. Masinick
*Attorney, Agent, or Firm*—Hubbell, Cohen, Stiefel & Gross

[57] ABSTRACT

An improved interactive image processing system (200,300) is provided which is capable of simultaneous processing of at least two different digitized composite color images to provide a displayable resultant composite color image. Each of the digitized composite color images have separate digitized red, blue and green image components and have an associated image information content. The system (200,300) includes separate image storage planes (246,346,70′,72′,74′,70″,72″,74″,70‴,72‴, 74‴,370,372,374,370′,372′,374′,370″,372″,374) for retrievably storing each of the digitized red, blue and green image components or other image data as well as graphic planes (78′,378) for storing graphic control data for processing of the images. The digital image processing of the image components is accomplished in a digital image processing portion (208,308) which includes an image processor (210,310) which contains the various storage planes in a refresh memory (246,346) which cooperates with a pipeline processor configuration (86′), image combine circuitry (270,272,274,270′,272′,274′) and other control circuitry to enable the simultaneous processing between each of the corresponding image planes on a pixel by pixel basis under interactive control of a keyboard (50′), data tablet (54′) or other interactive device. The system may be employed for interactive video processing (200) or as an interactive film printing system (300) in which the simultaneous processing of the two different images, which may be iterative, can be monitored in real time on a television monitor (44′,315). In the video system (200), the combining format of the image planes may be interactively varied on a pixel-by-pixel basis by creating different digital control masks for each pixel which are stored in refresh memory (246,346). In either system (200,300), the interactive simultaneous digital processing of the images is accomplished in an RGB format.

37 Claims, 6 Drawing Figures

PRIOR SYSTEM

INTERACTIVE VIDEO PRODUCTION SYSTEM

CROSS-REFERENCE TO RELATED APPLICATIONS

This application is a continuation-in-part of my co-pending U.S. patent application Ser. No. 39,184, filed May 15, 1979, now U.S. Pat. No. 4,258,385 entitled Interactive Video Production System and Method, and naming Wayne Duncan as a joint inventor.

BACKGROUND OF THE INVENTION

1. Field of the Invention

The present invention relates to both video and film production systems and methods and particularly to such systems and methods in which image combination and processing is to be achieved.

2. Description of the Prior Art

Video production systems are well known in which video information stored on conventional storage devices, such as analog video tape recorders, is processed in order to edit or treat the information so as to enhance the prerecorded information in the manner desired by the user. Such prior art video production systems known to applicant, however, are limited in that the prerecorded information can only be treated on a frame by frame basis in which the entire video frame of information must be treated. Thus, for example, if it is desired to change the coloration of a given video frame, the coloration of the entire frame must be modified. Thus, if it is desired to increase the red contained in a particular portion of an image of the frame, the entire frame must experience the red color change which increases the coloration of each of the portions of the entire video image by the inclusion of the additional red color change.

This has generally proven unsatisfactory and accordingly, matte techniques have been applied so as to attempt to limit the coloration to only the portions of the image desired. These matte techniques, however, are also limited, such as where they are employed to modify video images in real time in which a plurality of changes are desired in the frame. In addition, in applying such prior art matte techniques, as the portion of the image which is being treated moves in real time the matte or mattes employed must correspondingly move. This creates limitations on this technique when it is desired to process a rapidly changing scene as well as under other conditions. Accordingly, although such matte techniques are satisfactory for certain applications, they have limitations in other areas which have prevented the wide spread acceptance of such an approach as a viable method of specific color correction for portions of a video frame. In addition, another limitation on such prior art matte techniques is that if the video image being treated has a complex shape, considerable difficulty occurs in generating the matte to be used in treating such an image. For the above reasons, as well as others, prior art matte techniques have generally not enjoyed wide scale popularity in video production but rather have been limited to film production and optical printing.

It has also been known in the prior art to digitize video information. However, generally these techniques have not been applied to video production on a wide scale. An example of a digital video production system is the Ampex ESS-2; however, such a prior art digital production system does not employ real time interaction and, moreover, treats the composite video signal as an entity rather than separately processing its various color video components. This prior art digital video production system, however, is strictly a recording and playback device and does not enable pixel by pixel interaction with the video images. Thus, the limitations previously described in the prior art are not resolved by this type of system.

Another type of prior art digital image processing system is the type commercially available from Comtal Corporation of Pasadena, Calif. and distributed under the designation Vision ONE/20. This system is a real time interactive modular system which provides stand alone full feature image processing as well as the option of interfacing to numerous host computers. However, the prior art Comtal system is an image analysis system as well as an image enhancement system and has not been employed in video production. Accordingly, such system is not designed to handle real time interactive video production. For example, the information processed is processed in a 1:1 aspect ratio of previously digitized images, such as provided from a host computer, although the Comtal Vision ONE/20 does have a video digitizer option in which black and white video information may be provided to the system for processing in a 1:1 aspect ratio format, such as for graphic image treatment. In addition, the Comtal processor, since it provides processing on a 1:1 aspect ratio, treats the digital image on a 256 by 256, 512 by 512, or 1024 by 1024 active pixel basis. Thus, although the commercially available Comtal system is satisfactory for many applications it is not satisfactory for real time interactive video production at the video frame rate.

In addition to the above, it is well known in the prior art to modify color video information on a frame by frame basis, such as disclosed in U.S. Pat. Nos. 4,096,523 or Re. 29,787, although these prior art systems do not accomplish such modification on a pixel by pixel basis. There are also prior art image analysis systems in which a color video signal is digitized for image analysis such as disclosed in U.S. Pat. Nos. 3,835,245 and 3,739,078. Other prior art color video treatment systems known to applicant which enable treatment of a color video signal, although not on an active pixel by pixel basis and not enabling real time interactive control of such information treatment on a pixel by pixel basis, are disclosed, by way of example, in U.S. Pat. Nos. 4,017,680; 3,617,636; 3,904,816; 4,026,555; 4,000,510; 3,512,094; 4,060,829; 3,997,912; 3,899,662; 4,122,489; 3,949,416 and 3,969,757.

Thus, although the digitizing of video data for video image treatment is known in the prior art, as is the color modification of video information on a frame by frame basis, and the dot by dot control of static color separation images, other than my prior system described in my aforementioned copending U.S. patent application, there are no prior art systems known to applicant in which real time interactive video production treatment of video images provided at a real time video frame rate is accomplished on an active pixel by pixel basis, nor are there any prior art systems known to applicant in which a single frame of video may be interacted with in real time on a pixel by pixel basis.

Although the interactive video production system described in my copending U.S. patent application Ser. No. 39,184, overcomes many of the disadvantages of the prior art, it does not readily lend itself to simultaneous processing of multiple images on a pixel by pixel basis to produce a composite image in that my prior system employs NTSC encoding and decoding of the R, G, B component signals prior to the recording of the final processed composite image. Thus, although two component images, for example, can be processed in my prior system, to provide a final processed composite image, the first component image must be separately processed, encoded and stored before the second component image can be processed. Thereafter, the processed first component image must then be decoded, and merged with the processed second component image in memory to form the final processed composite image. This procedure can become both cumbersome and time consuming and the decoding and encoding process can possibly degrade the component images. The system of my present invention overcomes these problems by enabling the pixel by pixel simultaneous processing and storage of such multiple images.

In addition, although my prior system accomplishes foreground/background combination on a pixel-by-pixel basis, this is accomplished by image extraction on a frozen frame in refresh memory, as described in my aforementioned copending U.S. patent application, and not on a dynamic real time basis wherein each pixel has its own digital control mask which can be dynamically varied in real time to control the foreground/background image combination ratio for the pixel. Whereas, my prior system is an improvement over conventional chroma key techniques, the system of the present invention is a still further improvement providing in effect what may be termed interactive chroma keying. Thus, wherein prior art chroma key techniques require a predetermined set up of the images to enable proper chroma keying, no previous set up is required in the system of the present invention, and "chroma keying" can be accomplished on a pixel by pixel basis subsequent to the shooting of the original images to be combined in accordance with subsequently made decisions. This enables very subtle changes to be made. Moreover, the combining scheme or format may be based on any desired parameter such as color difference, luminance differences or user defined regions.

Film processing systems in which multiple images are to be combined to form a composite frame or final print are also well known in the art. Such prior art systems are generally known as optical printers, such as commercially available from Oxbury, by way of example. These prior art film optical printing systems are susceptible to several important disadvantages some of which are that these systems are not interactive during the optical printing process requiring all of the component mattes, if employed, and their associated images to have been previously correct; great care must be taken to avoid as much as possible the presence of the matte borders in the composite or final print; there is a finite limit on the number of images which can be combined because of film characteristics and image degradation problems; and the composite image being processed can not be viewed until the process has been completed and the final print developed requiring the entire process to be repeated if any errors are then noted. Moreover, although such prior art optical printing systems can do color correction, it must be done on a matte or frame basis and cannot be done on a pixel by pixel basis nor can it be monitored and changed from a preestablished scheme during the optical printing process. Several of the above disadvantages are directly related to the physical properties of the film media itself and to the photochemistry employed, such as for example in utilizing the photochemical process to separate foreground image from background in the "blue screen" process used in forming the mattes to be employed in making the final composite image.

These disadvantages of the prior art are overcome by the system and method of the present invention.

SUMMARY

An improved interactive image processing system is provided which is capable of simultaneous processing of at least two different digitized composite color images to provide a displayable resultant composite color image. Each of the digitized composite color images have separate digitized red, blue and green image components and have an associated image information content. The system includes separate image storage planes for retrievably storing each of the digitized red, blue and green image components or other image data as well as graphic planes for storing graphic control data for processing of the images. The digital image processing of the image components is accomplished in a digital image processing portion which includes an image processor which contains the various storage planes in a refresh memory which cooperates with a pipeline processor configuration, image combine circuitry and other control circuitry to enable the simultaneous processing between each of the corresponding image planes on a pixel by pixel basis under interactive control of a keyboard, data tablet or other interactive device. The system may be employed for interactive video processing or as an interactive film printing system in which the simultaneous processing of the two different images, which may be iterative, can be monitored in real time on a television monitor. In the video system, the combining format of the image planes may be interactively varied on a pixel-by-pixel basis by creating different digital control masks for each pixel which are stored in refresh memory. In either system, the interactive simultaneous digital processing of the images is accomplished in an RGB format.

DETAILED DESCRIPTION OF PREFERRED EMBODIMENTS

"Prior System"

Figure 1:
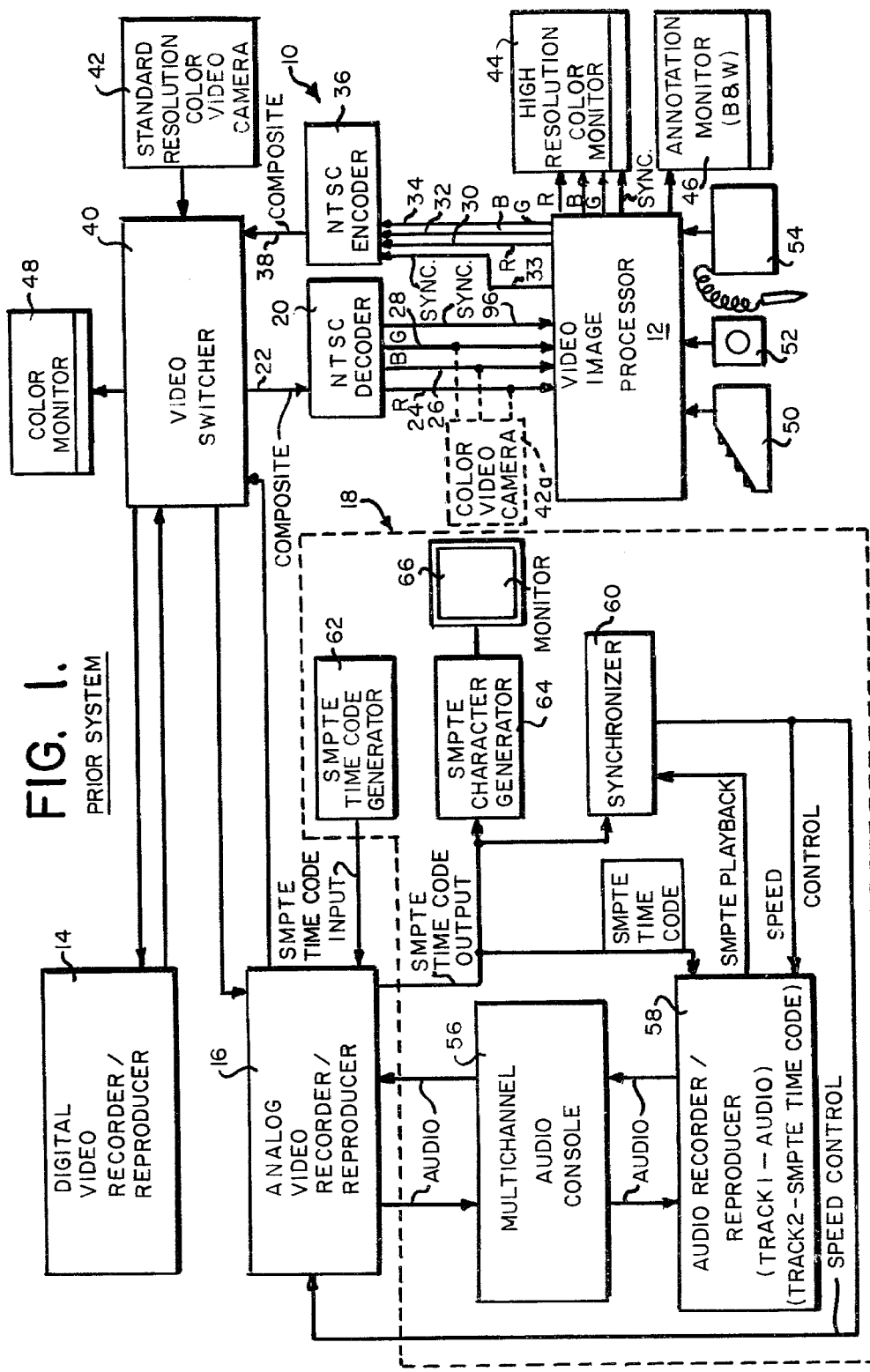
FIG. 1 is a block diagram of the prior system configuration of my previously filed copending U.S. patent application Ser. No. 39,184.

Before describing the improved system of the present invention illustrated in FIGS. 3 and 4 which is capable, among other things to be described hereinafter, of simultaneous processing of multiple images on a pixel-by-pixel basis to produce a final video composite image, or the interactive film printing system of the present invention illustrated in FIGS. 5 and 6 which adapts the technology of the system of FIGS. 3 and 4 to film printing, it would be helpful to review in detail my prior system described in my copending U.S. patent application Ser. No. 39,184 so as to more fully appreciate the improvements herein. Referring now to the drawings in detail and initially to FIGS. 1 and 2 thereof, the prior interactive video production system of my aforementioned copending U.S. patent application, generally referred to by the reference numeral 10, is shown. As shown and preferred, the system 10 includes a video image processor 12, to be described in greater detail hereinafter with reference to FIG. 2. The system 10 also preferably includes a conventional digital video recorder/reproducer 14, such as commercially available from Ampex under the designation Ampex ESS-2 Digital Video Production System, for enabling single frame video production, as will be described in greater detail hereinafter. In addition, the system 10 also includes a conventional analog video recorder/reproducer 16, such as an Ampex VPR-2 Video Production Recorder, for enabling real time multi-frame video production at the video frame rate, as will also be described in greater detail hereinafter. The system 10 also preferably includes an audio subsystem, generally referred to by the reference numeral 18, which maintains the synchronization between the audio and video portions of the video information recorded on the analog video recorder/reproducer 16. This audio subsystem 18, which is preferably a conventional synchronization system, will be described in greater detail hereinafter.

Figure 2:
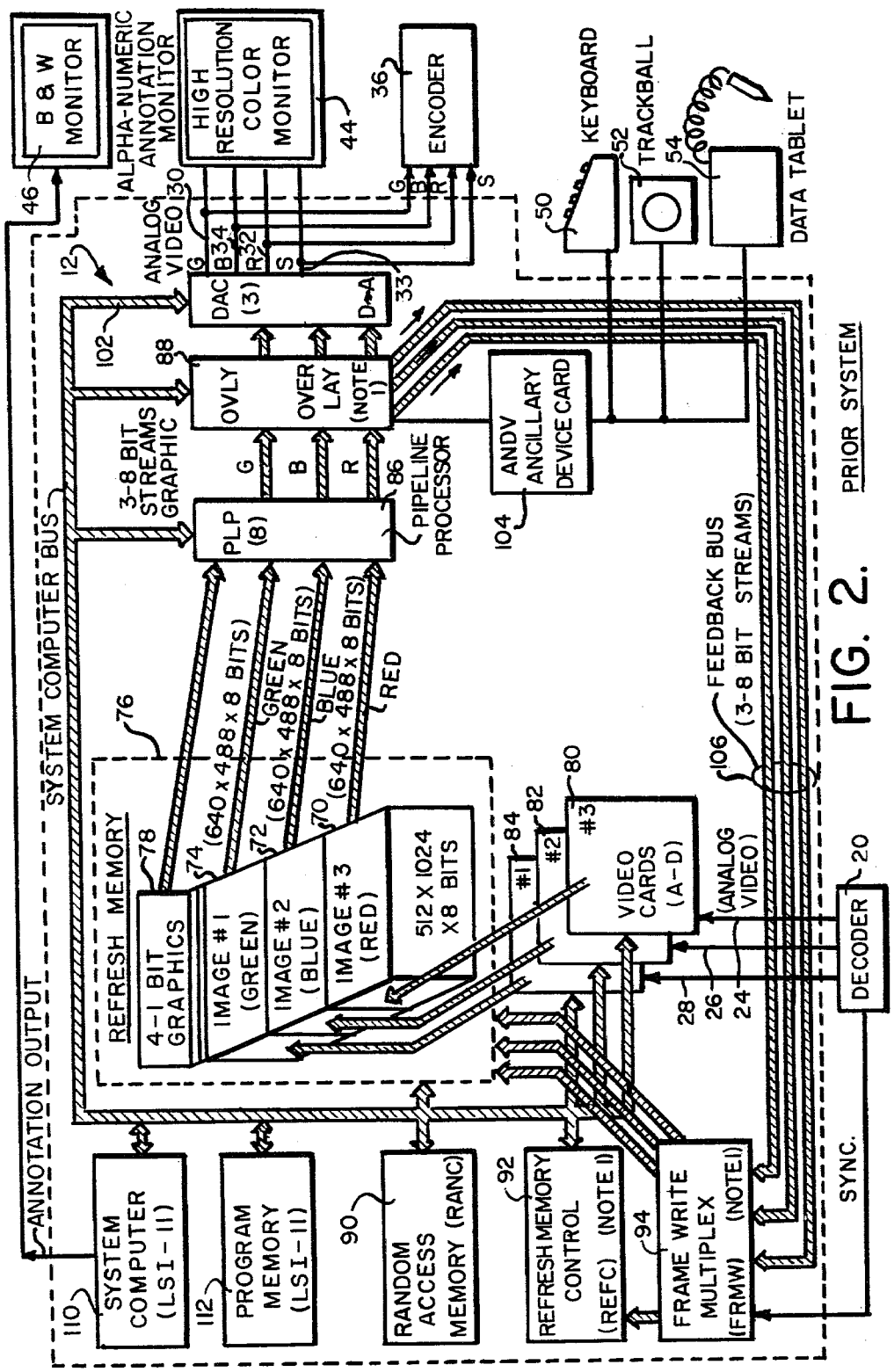
FIG. 2 is a block diagram, partially diagrammatic, of the digital video image processing portion of the system of FIG. 1.

The system 10 also preferably includes an NTSC conventional decoder, such as LENCO NTSC Chroma Decoder Model No. PCD363, generally referred to by reference numeral 20, for decoding a composite color video signal provided to the input thereof via path 22 into its analog red, blue and green color video and sync components which are provided as analog video output signals via paths 24, 26 and 28, and as sync via path 96, to the inputs of the digital video image processor 12, as will be described in greater detail hereinafter with reference to FIG. 2. As is further shown and preferred in FIG. 1, and as will also be described in greater detail hereinafter with reference to FIG. 2, after the video information is processed in processor 12, the processed red, blue and green color video component signals are converted into their analog equivalents and provided as processed analog output signals, and sync, via paths 30, 32, 34 and 33, respectively, to the input of a conventional NTSC encoder 36, such as a LENCO NTSC Encoder Model No. CEC810. The output of the encoder 36 is a composite analog processed color video signal provided via path 38 to one input of a conventional video switcher 40, such as Duca-Richardson Corporation DRC Series 4000 Video Switching System. This video switcher 40 also is operatively connected to the digital video recorder/reproducer 14, the analog video recorder/reproducer 16 and the NTSC decoder 20 in order to enable the controllable routing of video signals throughout interactive video production system 10 of FIGS. 1 and 2.

As is shown and preferred in FIG. 1, the video switcher 40 is operatively connected to a conventional standard resolution color video camera 42, such as an Ampex BCC-14, for providing a live composite color video signal input to the system 10. This live composite color video signal input, as will be described in greater detail hereinafter, is routed through the NTSC decoder 20 in the same manner as the previously described analog video signals retrievably stored in the analog video recorder/reproducer 16. However, if desired, a conventional color video camera could be employed which directly provides red, blue and green color video component signals as the outputs thereof in which instance the NTSC decoder 20 may be bypassed and these signals provided directly to the inputs of the image processor 12 via paths 24, 26 and 28. Such an arrangement is illustrated by the dotted lines in FIG. 1 with such a conventional color video camera being given reference numeral 42a.

As further shown and preferred in FIG. 1, the system 10 also preferably includes a separate high resolution conventional color monitor 44 and a conventional annotation monitor 46, which is preferably a black and white type of conventional monitor. Lastly, as shown and preferred in FIG. 1, the system 10 also preferably includes another conventional color monitor 48, such as one commercially available from Conrac, which is operatively connected to the video switcher 40 for monitoring the video information being routed through the video switcher 40. As will be described in greater detail hereinafter with reference to FIG. 2, the system 10 also preferably includes real time interactive controls for the video image processor 12, such as a conventional keyboard 50, a conventional track ball 52, and a data tablet 54 which is preferably arranged to have a 4:3 aspect ratio rather than the more standard 1:1 aspect ratio. If desired, other conventional real time interactive devices may be employed with the video image processor 12 to provide real time interactive control thereof. In addition, although a keyboard 50, a track ball 52 and a data tablet 54 are illustrated in FIGS. 1 and 2, any combination thereof may be employed in the system 10 of FIGS. 1 and 2.

With respect to the previously referred to audio subsystem 18, this subsystem 18 preferably includes a conventional configuration of an audio console 56, such as a Trident Fleximix console, a conventional audio deck 58, such as an Ampex ATR-100 which is a two track audio deck having audio on one track and SMPTE time code recorded on the other track, a conventional synchronizer 60 such as the EECO MQS-100 synchronizer, a conventional edit code generator 62, such as the EECO MTG-550, a conventional video character generator 64, such as an EECO BE-400, and an associated conventional black and white monitor 66 for displaying the time code information if desired. This configuration, as shown and preferred in FIG. 1, and as previously mentioned, is conventional and is operatively connected to analog video recorder/reproducer 16.

Referring now to FIG. 2, the video image processor 12 of FIGS. 1 and 2 is shown in greater detail. This video image processor 12 is preferably similar to a conventional image processor, such as the Comtal Vision ONE/20 image processor, but has been modified in a manner to be described in greater detail hereinafter to enable its use for processing of color video information provided at the video frame rate which can be interacted with in real time, such as via the keyboard 50, track ball 52 or data tablet 54, in a 4:3 aspect ratio. Thus, except as otherwise described, the various portions of the image processor 12 are preferably identical with corresponding portions commercially available from Comtal in the Comtal Vision ONE/20 and will not be described in greater detail. The image processor 12 is preferably a RAM refresh memory system which affords user access to a data base which ultimately preferably provides a 4:3 or 640 by 488 by 8 or 640 by 480 by 8 bit active pixel configuration. As shown and preferred in FIG. 2, this may be achieved by providing a 1024 by 512 by 8 bit data base and appropriately conventionally modifying this data base by either software or appropriate hardware to provide the 640 by 488 by 8 bit pixel configuration. If such a configuration is readily available in memory, then such configuration may be substituted for the modified 1024 by 512 by 8 bit data base. As is shown and preferred in FIG. 2, such a 640 by 488 or 640 by 480 active pixel configuration is provided for each of the three color component images, namely the red, blue and green, which is diagrammatically illustrated in FIG. 2 by reference numerals 70, 72 and 74 for the refresh memory 76. As also shown and preferred in FIG. 2, the image processor 12 also enables graphics overlay by providing four one bit graphics, with these graphics being in the same preferred 4:3 aspect ratio, with each of these graphics preferably being 640 by 488 by 1 or 640 by 480 by 1 bit. These graphics are diagrammatically represented in FIG. 2 by reference numeral 78. As used throughout the specification and claims, it should be noted that the term real time refers to operation at the video frame rate. The input to the refresh memory 76 is preferably conventionally handled by three separate input/output video cards 80, 82 and 84, with one such video card being provided for each of the three red, blue and green color video components. Each of these video cards 80, 82 and 84 preferably comprises a digitizer which converts the analog color video component signals into their digital equivalents for processing by the image processor 12. The actual processing in the image processor 12 is preferably handled by a conventional pipe line processor 86, such as the type provided in the Comtal Vision One/20, modified to accept a 4:3 aspect ratio, with each of the three color video component images, that is the red, blue and green, preferably being simultaneously separately processed in the processor 86 as three separate 8 bit streams of data. This modified conventional pipe line processor 86 preferably contains look-up tables, and function memories which, together with the random access refresh memory 76, enables treatment of the video images on a single pixel or group of pixels level in accordance with the desires of the user. Since this information may be provided at the video frame rate it, accordingly, may also be treated at the video frame rate in real time interaction dependent on the desires of the user expressed through means of the keyboard 50, track ball 52 and/or data tablet 54. Further information with respect to the functioning and operation of such a conventional pipe line processor 86 may be obtained by reference to technical information provided with the Comtal Vision ONE/20 image processor. The image processor 12 also preferably includes an overlay control 88 which preferably is similar to that commercially available in the Comtal Vision ONE/20 with the overlay control 88, of course, being modified to effect the aforementioned preferred 4:3 aspect ratio timing. This overlay control 88 preferably has numerous functions such as cursor/target definition, pseudo color implementation and final display priority commands similar to these functional controls which are effected in the Comtal Vision ONE/20 by the conventional overlay control card provided therein. The major function of the overlay control 88 is preferably to develop the proper priority selection for ultimate display on a per pixel basis. This priority selection must preferably take place within a single pixel display time and must preferably be switchable interactively at the video frame rate, which is preferably 30 times per second, within the retrace and flyback times of the synchronization system in order to avoid any flicker or other noticeable image distortion. It should be noted that the refresh memory 76 is preferably controlled by the random access memory control card 90, the refresh memory control card 92 and the frame/write multiplex control card 94, with random access memory control card 90 preferably being identical to that provided on the Comtal Vision ONE/20 as is also true with respect to the refresh memory control card 92 except for a modification in the timing circuitry to effect a 4:3 aspect ratio, so as to provide the correct blanking times associated therewith, and with the frame/write multiplex card 94 also preferably being identical to that conventionally available in the Comtal Vision ONE/20 except for corresponding conventional software changes to accomodate the preferred 4:3 aspect ratio timeing. In addition, as shown and preferred in FIG. 2, an external master sync 96 for controlling the operation of the processor 12 is provided to the system. This master sync signal 96 is preferably the sync signal provided from decoding of the composite analog color video signal provided via path 22 with this sync signal via path 96 being the sync output of decoder 20. The processed red, blue and green 8 bit data streams which are provided as outputs from the overlay control 88, are preferably provided to a conventional digital-to-analog converter 100 which is driven by the system computer bus 102 to provide separate analog color video component output signals, the red, blue and green color video component signals, as well as a sync signal, with these signals being provided via paths 30, 32, 33 and 34. These output signals represent the processed analog video component signals which are provided as the inputs to the conventional encoder 36 for encoding into the composite processed analog color video signal which is provided via path 38 to the video switcher 40.

As is also shown and preferred in FIG. 2, a conventional ancillary device card 204, such as conventionally provided in the commercially available Comtal Vision ONE/20, is provided for interfacing the real time interactive devices 50, 52 and 54 with the image processor 12 through the overlay control 88. As is also shown and preferred, the overlay 88 through a conventional three 8 bit data stream feedback bus 106 to the frame/write multiplex card 94 enables the actual viewed imagery to be read back into the refresh memory 76 in one frame time, such as 1/30 second based on a video frame rate of 30 frames per second. This feedback permits iterative processing with the pipeline processor tables and image combination circuits all updateable at the video frame rate of 30 times per second. As is true with respect to the commercially available Comtal Vision ONE/20, the image processor 12 is preferably controlled by a small system computer 110, such as a commercially available LSI-11, through which firmware or software commands are initiated thereby allowing user interaction via the aforementioned keyboard 50, track ball 52 or data tablet 54. The aforementioned commands are comprised in the conventional LSI-11 program memory 112 which is provided with the system computer 110. The programming of the system computer 110 to accomplish its control functions is conventional and is of the type employed in the Comtal Vision ONE/20 system with the exception that the software is conventionally modified to accommodate for the 640 by 488, or 640 by 480 if desired, active pixel configuration and the parallel processing of the three separate red, blue and green color video image components. As is also shown and preferred in FIG. 2, the annotation output is directly provided to the separate black and white monitor 46 for enabling separate monitoring of the annotation commands on monitor 46 and the processed video information on monitor 44. The processed analog video output signal may be recorded on the analog video recorder/reproducer 16 for future use, as will be explained in greater detail hereinafter, and/or may be temporarily stored on the digital video recorder/reproducer 14 if single frame processing is being accomplished.

Now describing the interactive video production method employed in connection with the system 10 of FIGS. 1 and 2. This video production method shall be described in terms of providing real time video production at the video frame rate, such as for image correction which includes color correction, intensity correction and editing within the frame, single frame video production in situations where real time video production becomes complex, such as where small area correction of a video frame is desired, and single frame video production per se, such as for use in animation. These various exemplary approaches illustrate the full range of flexibility of the video production method and system of FIGS. 1 and 2. In addition to the above, the video production method and system of FIGS. 1 and 2 may also be used in many other areas, such as special effects, rotoscoping of video images which could be accomplished electronically as well as many other applications of the system and method of FIGS. 1 and 2 which will readily occur to one of ordinary skill in the art based on the flexibility of this system and method.

Initially, the system and method of FIGS. 1 and 2 shall be described in terms of real time video production, that is video production at the video frame rate. For example, if it is desired to change a particular color component of a scene such as the color of the clothing of a person appearing in a scene, this may be accomplished by first locating the desired portion of the scene in which the color is to be changed by means of the data tablet 54. Thereafter the user would request from the image processor 12 that the particular assignment value of the color of that portion which has been located by means of data tablet 54, with this request being handled via the keyboard 50 input, and therefter the user would input through the keyboard 50 the desired color values for that portion of the scene. Under such circumstances, when the video tape which was contained on the analog video recorder/reproducer 16 was input through the image processor 12 at the video frame rate, with such information being input to processor 12 through the video switcher 40 and thereafter through the decoder 20 which would decode the recorded analog composite video into its red, blue and green color video components as well as sync, wherever that corrected color or substituted color appeared in a scene the new color would appear in any portion of the scenes being input at the video frame rate where the previously identified color appeared. Under such circumstances, only the corrected or substituted color which had been identified would be altered without any other change on a color basis being made to any other color in the scene. The same procedure could be employed for multiple colors since each of the scenes is treated on a pixel by pixel basis. The user in manipulating or treating these colors would preferably employ the color monitor 44 in order to visualize what results are being achieved by the video production method during processing. In addition, the aforementioned values with respect to the color changes would appear on the annotation monitor 46. The treated video tape information which would be output from the image processor 12 in terms of the processed red, blue and green color video components via paths 30, 32 and 34 as well as sync via path 30 are then provided to the encoder 36 whose output is, in turn, the composite processed analog color video signal provided via path 38, which is preferably an NTSC compatible video output signal such as one having 525 total scan lines at a video frame rate of 30 frames per second. This composite processed color video signal provided via path 38 is then routed by switcher 40 back to an analog video tape recording device for permanent storage of this processed video information.

Another example of the type of real time interactive video production which can be accomplished with the system and method of FIGS. 1 and 2 relates to the real time combination of different images from different sources, again taking advantage of the pixel by pixel treatment of this system and method. This technique, as will be described hereinafter, is different from chroma keying which depends on the use of specific colors to separate images from the background. No such type of color separation is required in the above method. Thus, for example, the input information to the processor 12 can be provided by a plurality of analog tape decks 16 with each tape deck containing the image information to be combined. However, the tape decks 16 would be input one at a time. Thus, if it is desired to combine an airplane with a background scene where the scene with respect to the airplane has been shot with a different background, the scene containing the airplane with background to be changed is first provided to the image processor 12 and the background is eliminated through the use of the keyboard 50. The residual image remaining is the airplane alone. This residual image, which has been output to encoder 36 is then preferably rerecorded on an analog video storage device 16. The rerecorded residual image is then input to the image processor 12 through decoder 20 along with the separately recorded scene of the desired background provided from a separate analog tape deck 16. The user then, via the keyboard 50, indicates to the image processor 12 that the residual airplane image has priority as the foreground. This is within the software capability of the commercially available Comtal Vision ONE/20. The image processor 12 then combines the two scenes blanking out the portions of the background which are visually overlaid by the residual image of the airplane. This combining function may be visually observed by the user on the color monitor 44 with the combination of images occurring at the video frame rate as the two separately recorded video tapes are being input to the image processor 12 at the video frame rate. This combined image is, thereafter, output at the video frame rate to encoder 36 and thereafter through video switcher 40 to an analog storage device for permanent recording of the processed video information. Again, it should be noted that the aforementioned real time interaction which enables the electronic combination of previously separately recorded images is accomplished on a pixel by pixel basis. In the instance of prior art chroma keying, the decision must be made in advance of the recording of the information, that is the decision to combine images; whereas in the above method no such restriction is required and any prerecorded scene, irrespective of a prior decision with respect to chroma content, may be combined.

If it is desired to isolate a portion of the frame so as to eliminate an image from the scene, this may be accomplished on a frame by frame basis where only a small area of the scene is to be treated. An example of circumstances under which such treatment is desired is where an unwanted image inadvertently appears in a scene. Under normal circumstances, the entire scene must be retaken at considerable cost. However, with the above method that portion of the scene can be eliminated and the correct background or other video information substituted therefor. This treatment is accomplished in the following manner. The first step in the above method would be to transfer that portion of the video tape which contains the unwanted information to the digital video recorder 14. The digital video recorder 14, which as was previously mentioned, is conventional, includes its own associated keyboard. The user utilizes this keyboard to retrieve a single frame of video information from video recorder 14. This single frame of information is routed through switcher 40, through decoder 20 and is input to the image processor 12 where it is displayed on the color monitor 44. The data tablet 54 is then employed to outline the specific area of the frame being displayed which is to be altered. The keyboard 50 is then employed to inform the image processor 12 to eliminate the video information contained in that designated area. If the unwanted image is located in the background, the keyboard 50 may also be employed to inform the image processor 12 to electronically extend the background to cover the eliminated area. If it is desired to substitute another image for the unwanted image rather than to merely extend the background, then the information to be substituted can be separately input to the image processor 12 and electronically conformed to the shape of the area being eliminated. All of the above three features are within the software capabilities of the commercially available Comtal Vision ONE/20. The combination of the substituted image may thereafter be accomplished in the same manner previously described above with respect to the combination of images. In addition to providing substitution or combination images to the processor 12 from a separate recording device, this information can also be provided from a color video camera 42 or 42a if it is desired to combine or substitute live information with previously recorded information. This can be accomplished by displaying the live image provided from camera 42 or 42a through the video cards 80, 82 and 84 with the single frame of information being provided from video recorder 14 being stored in the refresh memory 76. The combination of the displayed live image and the image from the refresh memory 76 may be accomplished in the manner described above with respect to the combination of images.

Another example of the advantages of single frame treatment in the above video production method is when it is desired to relocate an image previously recorded in a scene to a different portion of the scene. In order to accomplish this, the image to be moved is outlined with the data tablet 54 and a new target location in the scene is selected with the track ball 52. The keyboard 50 is then employed to inform the image processor 12 to move the outlined image indicated by data tablet 54 to the new target location indicated by track ball 52. This is within the software capabilities of the commercially available Comtal Vision ONE/20. The single frame of information which has been provided from video recorder 14 and which has now been processed is then output through encoder 36 and routed through switcher 40 for subsequent rerecording back onto the video recorder 14. This processed single frame information which has been treated on a frame by frame basis from recorder 14 is then subsequently rerecorded on an analog recorder 16 for permanent storage of the processed information. The same type of image relocation technique can be employed in creating special effects, such as by separating an image into its component portions which can be relocated to different portions of the scene on a frame by frame basis, such as for example if it is desired to create the visual illusion of an explosion. Again, this is facilitated by the treatment of an image on an active pixel by pixel basis which enables the relocation of the portions of the image on such a pixel by pixel basis.

As was previously mentioned, another example of the flexibility of the above method is in connection with animation. In employing such a technique, previously drawn black and white cels may be input to the image processor 12, such as by means of the color video camera 42a, with each of the cels being temporarily stored in the refresh memory 76. The animator may then outline the designated areas to be colored by the use of the data tablet 54 or may locate target areas for coloring by means of the track ball 52 with the animator observing the cel to be treated on the color monitor 44. The keyboard 50 is then employed to select the desired color for the designated area and to inform the image processor 12 to assign that color to the designated area, as was previously mentioned with respect to color correction. This technique is accomplished for the entire scene on a frame by frame basis with each frame then being output through encoder 36 and video switcher 40 for recording on the digital video recorder 14 until the entire process has been completed. Thereafter the processed information recorded on digital video recorder 14 is provided to the analog video recorder 16 at the video frame rate for permanent storage of the completed color animation. This processed animated analog video information which has been recorded on recorder 16 can now be combined with other recorded analog information either live or prerecorded in the same manner previously described above with respect to the combination of images.

Summarizing the above method, the information to be interactively treated on a real time basis is retrievably stored as a composite analog color video signal which is provided at the real time video frame rate through decoder 20 to the image processor 12. The image processor 12 then digitizes the separately provided red, blue and green analog video output signals and digitally processes these signals in a 4:3 aspect ratio configuration of active pixels, such as the aforementioned 640 by 488 by 8 or 640 by 480 by 8 bit configuration. The keyboard 50, track ball 52 and data tablet 54 are employed to enable the real time interactive control of this digital processing on an active pixel by pixel basis. As a result of this interactive processing, the processed video information is reconverted to corresponding analog video signals, thereafter encoded and rerecorded for permanent storage. When it is desired to treat the information on a single frame basis, the information is recorded on a digital video recorder and is then provided to the image processor 12 on a frame by frame basis. After the image treatment is completed, the information is then recorded on the analog recorder at the video frame rate.

"Improved Interactive Video Production System"

Figure 3:
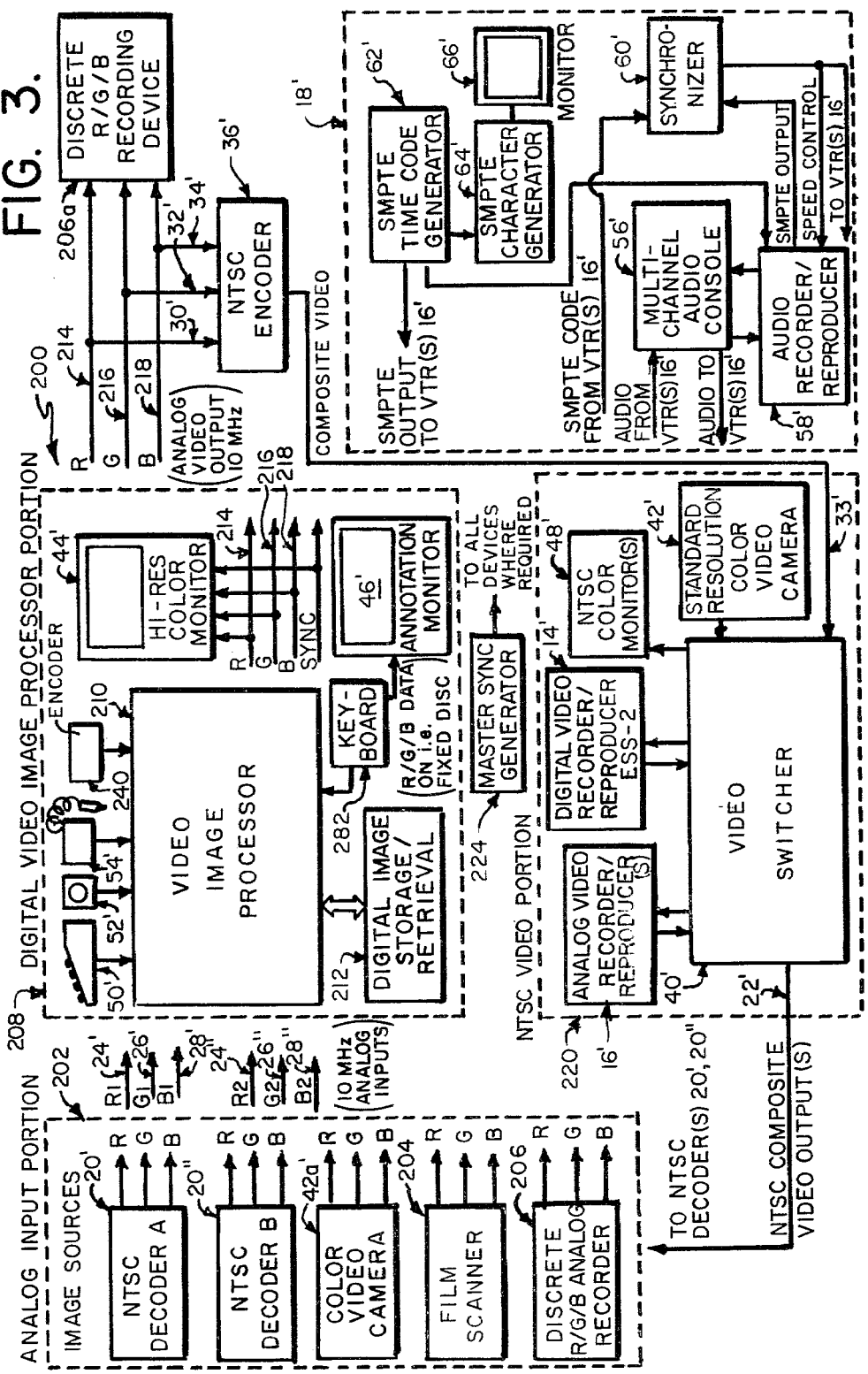
FIG. 3 is a block diagram, similar to FIG. 1, of the improved interactive video production system of the present invention.
Figure 4:
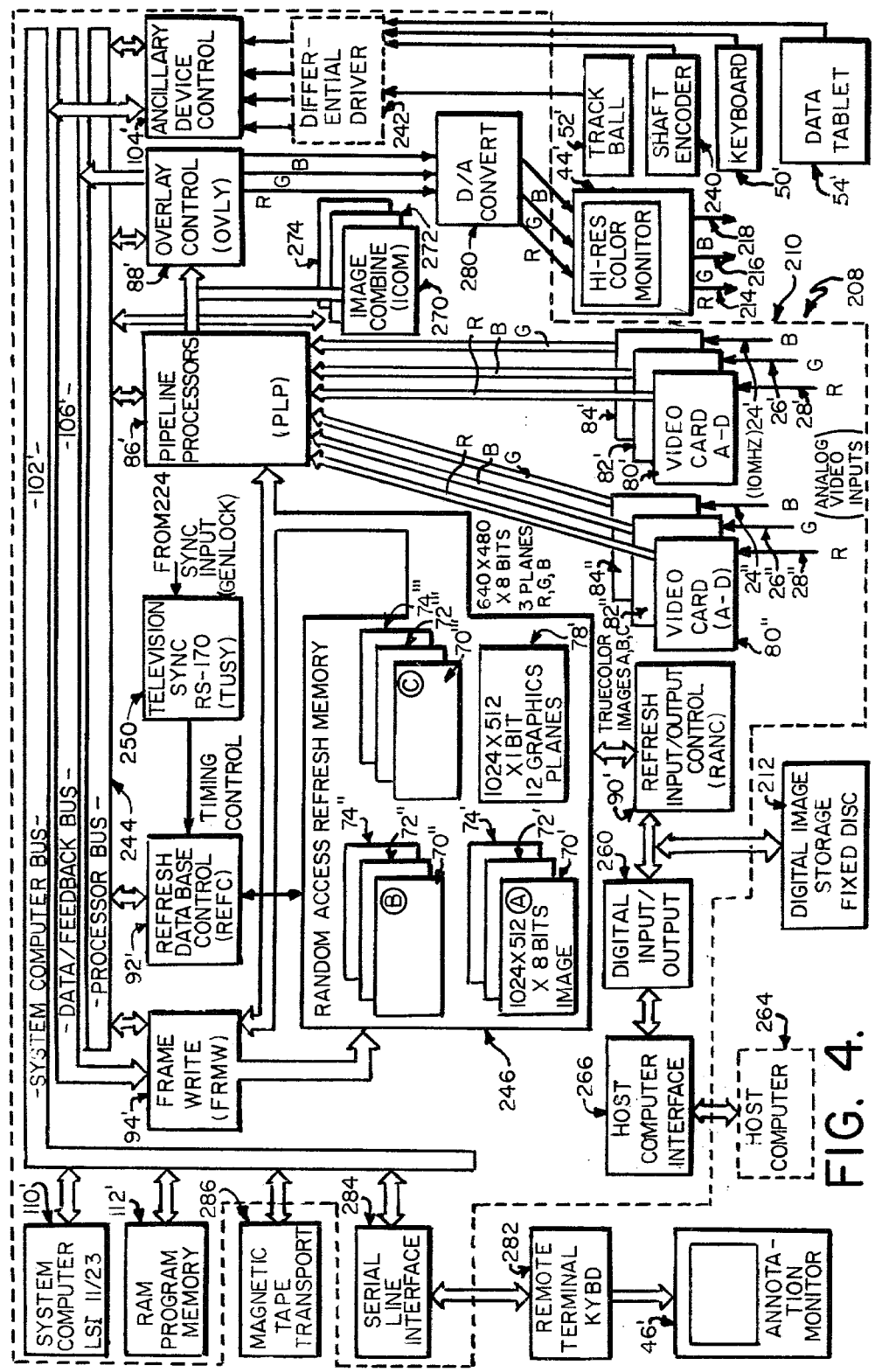
FIG. 4 is a block diagram, similar to FIG. 2, of the improved digital video image processing portion of the system of FIG. 3.

Referring now to FIGS. 3 and 4, the improved interactive video production system 200 of the present invention shall now be described. For purposes of explanation, similarly functioning components in the improved system of FIGS. 3 and 4, generally referred to by the reference numeral 200, will be given the same reference numeral as in the system 10 of FIGS. 1 and 2 followed by the prime symbol "'". As shown and preferred in FIG. 3, the improved system 200 of the present invention includes an analog input portion 202 for providing selectable red (R), blue (B) and green (G) analog video inputs from a plurality of selectable analog image sources, such as from a conventional NTSC decoder 20' or 20", with two such decoders 20', 20" being shown by way of example in FIG. 3; or from a conventional color video camera 42a', or from a conventional type of film scanner 204, such as one utilizing a 10 MHz black and white video camera optically connected to a pin registered film movement and light source and RGB filter arrangement (not shown); or from a discrete RGB analog recorder 206, such as one employing a conventional modulator in conjunction with a conventionally modified Bosch-Fernseh BCN-50 one inch type B VTR having its bandwidth extended to 14 MHz to enable the red (R), green (G) and blue (B) signal components to be separated according to preselected bandwidths for separate storage and playback (not shown). The selectable analog input sources 20', 20", 42a', 204 or 206 are selectively provided as analog inputs to a digital video image processor portion 208 which preferably includes a video image processor 210, to be described in greater detail with reference to FIG. 4, a high resolution color TV monitor 44', an annotation monitor 46', and a digital image storage/retrieval memory 212, such as a conventional fixed disc formatted in RGB format. As shown and preferred in FIGS. 3 and 4, two sets of selectable RGB inputs 24', 26', 28' and 24", 26", 28", respectively, are provided to the video image processor 210 to enable simultaneous processing of multiple images from the analog input portion 202 on a pixel-by-pixel basis. The bandwidth of the analog video input ports to the video image processor 210 are preferably 10 MHz each by way of example. As will be described in greater detail hereinafter, the image processing of the images from the analog input portion 202 in the preferred digital video image processor portion 208 of the present invention preferably all takes place in red, blue, green or RGB format and may constantly be monitored on monitor 44' or, additionally, in the case of annotations, on monitor 46'.

The RGB output of the video image processor 210 is an analog RGB output provided via paths 214, 216 and 218 for the red (R), green (G) and blue (B) signals, respectively. This RGB analog output 214, 216, 218 is preferably provided in parallel to either the discrete RGB analog recorder 206 or to another such recorder 206a as well as to a conventional NTSC encoder 36' via paths 30', 32', 34'. The RGB storage of the RGB analog output 214, 216, 218 from the video image processor 210 enables further processing of the image, if desired, without the necessity of NTSC encoding and subsequent decoding as required in my prior system of FIGS. 1 and 2. The simultaneous provision of this RGB analog output 214, 216, 218 to the NTSC encoder 36' enables the processed image to be converted to NTSC composite video and to thereafter be made accessible, via path 38', to an NTSC video portion 220 for conventional NTSC storage of the final processed composite video image or for further NTSC processing if desired. The NTSC video portion 220 is preferably identical with the NTSC video portion of my prior system 10 and includes the video switcher 40' which receives the composite video output of the NTSC encoder 36', the standard resolution color video camera 42', the NTSC color monitor or monitors 48', the digital video recorder/reproducer 14' such as an Ampex ESS-2, and the analog video recorder/reproducer or recoder/reproducers 16'. The output of the NTSC video portion 220 is an NTSC composite video output or outputs provided via path 22' to the appropriate NTSC decoder 20' or 20". As further shown and preferred, and as is also true with respect to the system 10 of FIGS. 1 and 2, the system 200 includes an audio subsystem 18' which is a conventional synchronization system which maintains the synchronization between the audio and video portions of the video information recorded on the analog video recorder/reproducer 16'. The audio subsystem 18' preferably comprises the same configuration as the audio subsystem 18 of FIG. 1; namely, audio console 56', audio deck 58', synchronizer 60', SMPTE time code generator 62', video character generator 64', and black and white monitor 66' for the aforementioned display of the time code information, if desired. As further shown and preferred, a conventional external master sync generator 224 may be provided in order to conventionally supply appropriate sync signals throughout the system 200, such as to the sync input of the video image processor 210 as well as to all devices in the NTSC video portion 220, the NTSC decoders 20', 20", the discrete RGB analog recorders 206, 206a, and the NTSC encoder 36', if desired.

Referring now to FIG. 4, the improved digital video image processing portion 208 of the interactive video production system 200 of the present invention shall now be described in greater detail. The digital video image processing portion 208, as shown and preferred in FIG. 3, includes the improved video image processor 210 which is preferably similar to the video image processor 12 of the system 10 of FIGS. 1 and 2 except that the improved video image processor 210 has been modified to enable the simultaneous processing of multiple color images on a pixel-by-pixel basis, in real time if desired, to produce a composite video image without the necessity of the NTSC encoding and decoding employed in connection with the video image processor 12 of the system 10 of FIGS. 1 and 2. In addition, as will be described in greater detail hereinafter, the improved video image processor 210 of the present invention has also been modified to enable interactive chroma keying on a pixel-by-pixel basis in real time. Moreover, as will also be explained in greater detail hereinafter, other modifications have been made to the improved video image processor 210 to enhance its ability to combine color images during processing. Thus, except as otherwise described, the various portions of the video image processor 210 and associated devices forming the digital video image processor portion 208 are preferably identical with corresponding portions of the video image processor 12 of the system 10 of FIGS. 1 and 2, and like associated devices, and will not be described in greater detail hereinafter except where more clarity is desired.

As is true with the video image processor 12 of the system 10 of FIGS. 1 and 2, the improved video image processor 210 of the present invention can be employed for processing of color video information provided at the video frame rate and interacted with in real time, if desired, such as via the keyboard 50', track ball 52', data tablet 54', or shaft encoders 240, such as a 4:3 aspect ratio. If the line length between these various ancillary control devices 50', 52', 54' or 240 is sufficiently long so as to cause possible data loss problems, a conventional differential driver 242 may be employed as an interface between these ancillary control devices 50', 52', 54' or 240 and the ancillary device control portion 104' of the video image processor 210. The ancillary device control portion 104' is the interface to the system computer 110' via the system computer bus 102' and is accessed via the processor bus 244. The image processor 210, like the image processor 12 of the system 10 of FIGS. 1 and 2, is preferably a RAM refresh memory system which affords user access to a data base which ultimately preferably provides a 4:3 or 640 by 488 by 8 or 640 by 480 by 8 bit active pixel configuration. As shown and preferred in FIG. 4, this may be achieved by providing a 1024 by 512 by 8 bit data base and appropriately conventionally modifying this data base by either software or appropriate hardware to provide the 640 by 488 by 8 or 640 by 480 by 8 bit pixel configuration. If such a configuration is readily available in memory, then such configuration may be substituted for the modified 1,024 by 512 by 8 bit data base.

As shown and preferred in FIG. 4, whereas the random access refresh memory 76 of the system 10 of FIGS. 1 and 2 provides such a 640 by 488 or 640 by 480 active pixel configuration for each of the three color component images, namely red (R), blue (B) and green (G) of a single image 70, 72, 174 the random access refresh memory 246 of the video image processor 210 of the present invention preferably provides such an active pixel configuration for each of the three color component images of up to three different true color images, 70', 72', 74', 70'', 72'', 74'', 70''', 72''', 74'''. In addition, whereas the image processor 12 of the system 10 of FIGS. 1 and 2 enables graphics overlay by providing four one bit graphics planes 78 in the refresh memory 76, the refresh memory 246 of the image processor 210 of the present invention preferably provides up to twelve such one bit graphics planes 78', with these graphics being in the same preferred 4:3 aspect ratio and with each of these graphics preferably being 640 by 488 by 1 or 640 by 480 by 1 bit and being derived from a 1024 by 512 by 1 bit data base in the same manner as described above.

The video image inputs to the refresh memory 246, are preferably now conventionally handled by two sets of separate video input/digital output through the pipeline processor 86' video cards 80', 82', 84' and 80'', 82'', 84'', with one such video card in each of these two sets 80'-82'-84', 80''-82''-84'' being provided for each of the three red, blue and green color video components. Under normal color image processing, each of these video cards may preferably access the appropriate color image plane of any of the three different image storage planes 70'-72'-74', 70''-72''-74'', 70'''-72'''-74''', with video cards 80' and 80'' accessing the red color image storage planes, video cards 82' and 82'' accessing the blue color image storage planes and with video cards 84' and 84'' accessing the green color image storage planes. As was true with the video cards 80, 82 and 84 of the system 10, each video card 80', 82', 84', 80'', 82'', 84'' preferably comprises a digitizer which converts the analog color video component signals into their digital equivalents for processing by the image processor 210. The actual processing in the image processor 210 is preferably handled by the same type of pipeline processor configuration 86' as employed in the system 10 of FIGS. 1 and 2, with the pipeline processor functions being conventionally hard wired tables connected to each possible image and graphics plane in the refresh memory 246. Each of the video cards 80', 82', 84', 80'', 82'', 84'' is preferably associated with a dedicated pipeline processor in the pipeline processor configuration 86'. The pipeline processor configuration 86' preferably contains look-up tables and function memories which, together with the random access refresh memory 246, enable treatment of the video images on a single pixel or group of pixel level in accordance with the desires of the user. The image processor 210 also includes a refresh data base control portion 92', a frame write portion 94', a refresh input/output control portion 90' and an overlay control portion 88' all of which are similar in function to the like elements previously described with reference to the system 10 of FIGS. 1 and 2 with the exception that the overlay control 88' and frame write 94' have been modified to provide simultaneous loading of the various image planes of the refresh memory 246 in the freeze frame mode which is at the video real time frame rate. In the freeze frame mode, the resultant image data from the pipeline processor 86' can be reloaded into refresh memory 246 to accomplish iterative processing of the image. The timing signals for the refresh data base control portion 92' are provided from a conventional television sync card 250 which provides the capability to synchronize the image processor 210 to an external video sync RS-170 signal supplied from the master sync generator 224.

The refresh input/output control 90' controls the data paths for non-video input/output transfers of the refresh memory 246.

The refresh input/output control 90' is connected to a conventional asynchronous digital input/output card 260, such as commercially available in the Comtal Vision One/20, which, together with the refresh input/output control 90', controls the asynchronous loading of digital image data into the refresh memory 246. This digital image data is retrieved from a digital image storage device, such as the conventional fixed disc 212, or from a conventional host computer 264 such as a DECPDP11/34, via a conventional computer interface 266, such as a Comtal CSIO card. The pertinent data and protocol with respect to the Comtal CSIO card is fully described in the Comtal Vison One/20 Users Manual which is incorporated by reference herein and need not be further described herein.

As shown and preferred in FIG. 4, the operating system for the system computer 110' as well as for the balance of the video image processor 210 is substantially contained in the RAM program memory 112'.

As further shown and preferred, before the image data output from the pipeline processor configuration 86' is provided to the overlay control portion 88', it may, if desired, be further processed via image combine cards 270,272,274, with each of the three image combine cards 280,272,274 being dedicated to combining a different one of the three R,G,B image planes of up to two different true color images. Thus, image combine card 270 would be dedicated to combining two different red image planes, image combine card 272 would be dedicated to combining two different green image planes and image combine card 274 would be dedicated to combining two different blue image planes prior to the input of the resultant combined processed true color image to the overlay control portion 88'. These image combine cards 270,272,274 are otherwise each preferably conventional, such as the single ICOM image combine card commercially available in the COMTAL Vision One/20 which is capable of combining images on a pixel-by-pixel basis, with the exception that such an ICOM card is conventionally modified to enable the combining scheme or format of the image planes to be dynamically varied on a pixel-by-pixel basis within a frame as opposed to on an entire frame-by-frame basis. The image data input to the image combine cards 270,272,274 may come either from refresh memory 246 or from an external analog video input via the video cards 80'-82'-84', 80"-82"-84".

The output of the overlay control portion 88' is either provided to the frame write card 94' via the data/feedback bus 106' or supplied to the high resolution color monitor 441 via a conventional digital to analog converter interface 280 which conventionally converts the twenty-four bit digital image data, having eight bits for each of red, green and blue, into the appropriate analog video signals for display on the high resolution color monitor or CRT 44'. In addition, these same RGB analog video outputs 214, 216, 218 can be supplied to the rest of the system 200 such as for recording on the discrete RGB analog recorders 206a or 206 or for NTSC encoding via NTSC encoder 36' via paths 30', 32', 34', respectively.

As also shown and preferred, the annotation monitor 46' has an associated conventional ASCI keyboard 282 which is operatively connected to the video image processor 210 via a conventional serial line interface 284, such as an RS-232C interface card which allows a separate terminal, i.e. annotation monitor 46', to communicate with the system computer 110' over the system computer bus 102'.

A conventional magnetic tape transport 286 is preferably provided to enable loading of the system 200 control program in a conventional manner.

Now describing the interactive video production method employed in connection with the improved system 200 of FIGS. 3 and 4 which enables, among other things, simultaneous processing of multiple images on a pixel-by-pixel basis, as well as interactive chroma keying on a pixel-by-pixel basis. For purposes of explanation, the use of the system 200 in connection with the simultaneous processing of multiple images shall be described first. Such simultaneous image processing can be accomplished either on a real time basis at the video frame rate with new image data being provided every 1/30th of a second or on a frame-by-frame basis.

In order to accomplish real time simultaneous combination of two different color images, by way of example, these images are input to the pipeline processor configuration 86' via the two sets of video cards 80'-82'-84', 80"-82"-84", with one set of video cards being associated with each color image source. The input 24'-26'-28', 24"-26"-28" to the video cards 80'-82'-84', 80"-82"-84", respectively, is an analog video input in RGB format which is digitized in this RGB format and provided to the pipeline processor configuration 86'. The desired image combining scheme, on a pixel-by-pixel basis, is ultimately provided to the image combine cards 270, 272, 274 from the interactive keyboard 50' via the system computer bus 102'. The image combine cards 270, 272, 274, which are accessed via the processor bus 244, combine the two simultaneous real time RGB image inputs on a pixel-by-pixel basis in accordance with the combining scheme being dynamically selected by the keyboard 50'. If desired, prior to processing by the image combine cards 270, 272, 274, color correction and gamma correction may be accomplished on each separate true color image plane by selection of appropriate function memories in the pipeline processor configuration 86'.

The real time true color video images being combined via the image combine cards 270, 272, 274 may be provided from any analog color video input source desired, such as a VTR or a live video camera, or any combination thereof. The processed RGB output of the image combine cards 270, 272, 274 is provided to the overlay control 88' and therefrom, via the digital-to-analog converter 280, to the system 200 via paths 214, 216, 218 for recording and/or display of the resultant combined image either in NTSC or RGB format.

Alternatively, if desired, two different color images can instead be provided from the refresh memory 246 for simultaneous combination thereof on a pixel-by-pixel basis via the image combine cards 270, 272, 274. In such an instance, the color images are combined on a frame-by-frame basis at the pixel-by-pixel level as each frame is provided from the refresh memory 246, with a different set of RGB image planes being associated with each of the two color images to be combined, such as image planes 70'-72'-74' for one image and image planes 70"-72"-74" for the other combining image. The output of the refresh memory 246 is provided to the image combine cards 270, 272, 274 via the pipeline processor configuration 86'. The resultant combined image in RGB format is then provided to the overlay control 88' either to be provided to the frame write card 94' for rewriting or storage of the resultant image on to another set of the image planes 70"-72"-74" in the refresh memory 246, or to the digital-to-analog converter 280 for provision to the balance of the system 200 via paths 214, 216, 218. The resultant frame image stored on image planes 70"-72"-74" may be stored on the external digital image storage disc 212 under control of the refresh input/output control 90', if desired, in order to keep this resultant processed frame in digital format for further processing as well as to enable frame-by-frame RGB storage of the resultant processed images. This combining process is an iterative process and the resultant combined image on image planes 70"-72"-74" can subsequently be reprocessed with another combining image either from one of the other sets of image planes 70'-72'-74' or 70"-72"-74" in the refresh memory 246 or with an image provided from one of the sets of video cards 80'-82'-84' or 80"-82"-84", as is also true with respect to any of the other sets of image planes 70'-72'-74', or 70"-72"-74" in the refresh memory 246. Thus, two different true color images, irrespective of origin, i.e., externally supplied analog video or stored digital image data, can be simultaneously combined on a pixel-by-pixel basis to provide a resultant combined true color video image.

The image isolation method described with reference to the system of FIGS. 1 and 2 may be enhanced in the system 200 of the present invention to simultaneously combine isolated portions of two color frames or images at any given time. In such an instance, as was true with the system 10 of FIGS. 1 and 2, the data tablet 54' may be employed to define the isolated portions to be combined. Prior to doing this, the refresh memory 246 is loaded in RGB format with the two different frame images containing the portions to be isolated and combined, with each image being stored in a different set of image planes in the refresh memory 246. This image data can be provided to the refresh memory 246 either from the video cards 80'-82'-84', 80"-82"-84 or from the storage disc 212. If an analog video input is to be provided from film, then this input to the video cards 80'-82'-84' and/or 80"-82"-84" is preferably provided from one or more film scanners 204. After the two different images are loaded into the refresh memory 246, a one bit graphic plane is overlaid over each set of RGB image planes in the refresh memory 246 under command of the keyboard 50: After the graphic plane has been overlaid, one of the two stored images in refresh memory 246 is displayed on the monitor 44' along with its overlaid graphic plane. The portion of the displayed image to be isolated for combination with a selected portion of the other image is then outlined on the graphic plane via the data tablet 54'. The resultant outlined portion is then filled; in other words all pixels within that portion are turned on, which generates a graphic mask of this area or portion which is stored in the graphics portion 78' of the refresh memory 246. This procedure is repeated for the portion of the other image to be combined using a different one bit graphic plane to generate a separate graphic mask. The stored graphic masks become the frame write control signals for the writing of the isolated image portions in the set of "scratch-pad" image planes, such as 70"-72"-74". Thus, the stored graphic mask relating to the first image, such as on image planes 70'-72'-74', is used to control the writing of the outlined image data for this image on to the "scratch pad" image planes 70""-72'"-74"' under conventional operating system control such as in the Comtal Vision One/20. Thereafter, the stored graphic mask relating to the second image, such as on image planes 70"-72"-74", is similarly used to control the writing of the outlined image data for this image on to the same set of "scratch-pad" image planes 70'"-72'"-74'" as the first image. Subsequently, again under conventional operating system control, such as in the Comtal Vision One/20, a new one bit graphic mask for the resultant image stored on the "scratch-pad" image planes 70'"-72'"-74'" is then generated and updated or supplemented each time a new portion is added to the resultant "scratch-pad" image. Of course, if desired, the portions of the images can be superimposed changed in size, or dynamically or repositioned in the resultant image each time a transfer is made. The various portions of the images can be further processed via the pipeline processor configuration 86', if desired, prior to storage on the "scratch-pad" image planes 70'"-72'"-74'". The resultant image can then be stored and/or further combined via the image combine cards 270, 272, 274 with either a different stored digital image from the refresh memory 246 or with a digitized analog video input from the video cards 80'-82'-84' or 80"-82"-84". Of course, the graphic mask may be generated in many other ways which will occur to one of ordinary skill in the art and need not be enumerated herein.

As was previously described, the improved system 200 of the present invention may be employed to achieve interactive chroma keying on a pixel-by-pixel basis by generating a separate control mask for each pixel. The control mask is preferably an 8 bit digital control signal which defines the combining ratio of the two pixels being combined in the resultant image. The interactive chroma key method of the present invention is generally employed in connection with two real time digitized analog color video inputs to the system 200 via the video cards 80'-82'-84' and 80"-82"-84". A representative frame of each of the two digitized analog color video inputs from the video cards 80'-82'-84' and 80"-82"-84" is provided to the refresh memory 246 via the pipeline processor configuration 86', overlay control 88' and frame write 94', with each of these two representative frames being stored in a different set of image planes 70'-72'-74', 70"-72"-74", respectively, in the refresh memory 246. The desired foreground background mix ratio can be defined on a pixel-by-pixel basis within a range of 256 possible intensity levels, for example, as defined by eight bits. Thus, for example, a 50% mix between the two images for a given resultant pixel would be equivalent to an intensity level equivalent to the eight bit digital word representation of the number 128, whereas the digital equivalent of the number 0 or 255 would represent the opposite extremes of all of one image or all of the other image. The particular eight bit control signal or mix may be determined by display of an image on monitor 44' of the superimposed stored representative frames with the desired chroma key or foreground/background mix for each pixel or group of pixels then being selected by the user through the use of the data tablet 54' and the keyboard 50' and the conventional image analysis functions of the type normally provided by the Comtal Vision One/20 operating system. The resultant eight bit control mask is preferably stored in one of the remaining or "scratch-pad" image planes 70'" or 72'" or 74'". The eight bit control mask stored in the one "scratch-pad" image plane 70'" or 72'" or 74'" is then used as the control data for the image combine cards 270, 272, 274 which are then employed in the manner previously described to combine the two real time inputs from the video cards 80'-82'-84' and 80"-82"-84" in accordance with this control data. If desired, this control data can be changed at any time by preferably repeating the above procedure to establish a new set of control data. In addition, different control data for a plurality of different scenes can be initially established from representative frames and separately stored on the disc 212 for selective call-up via the keyboard 50' as the scene being processed changes. The resultant combined image is provided to the digital-to-analog converter 280 and, therefrom, via paths 214, 216, 218 to the balance of the system 200.

"Interactive Film Printing System"

Figure 5:
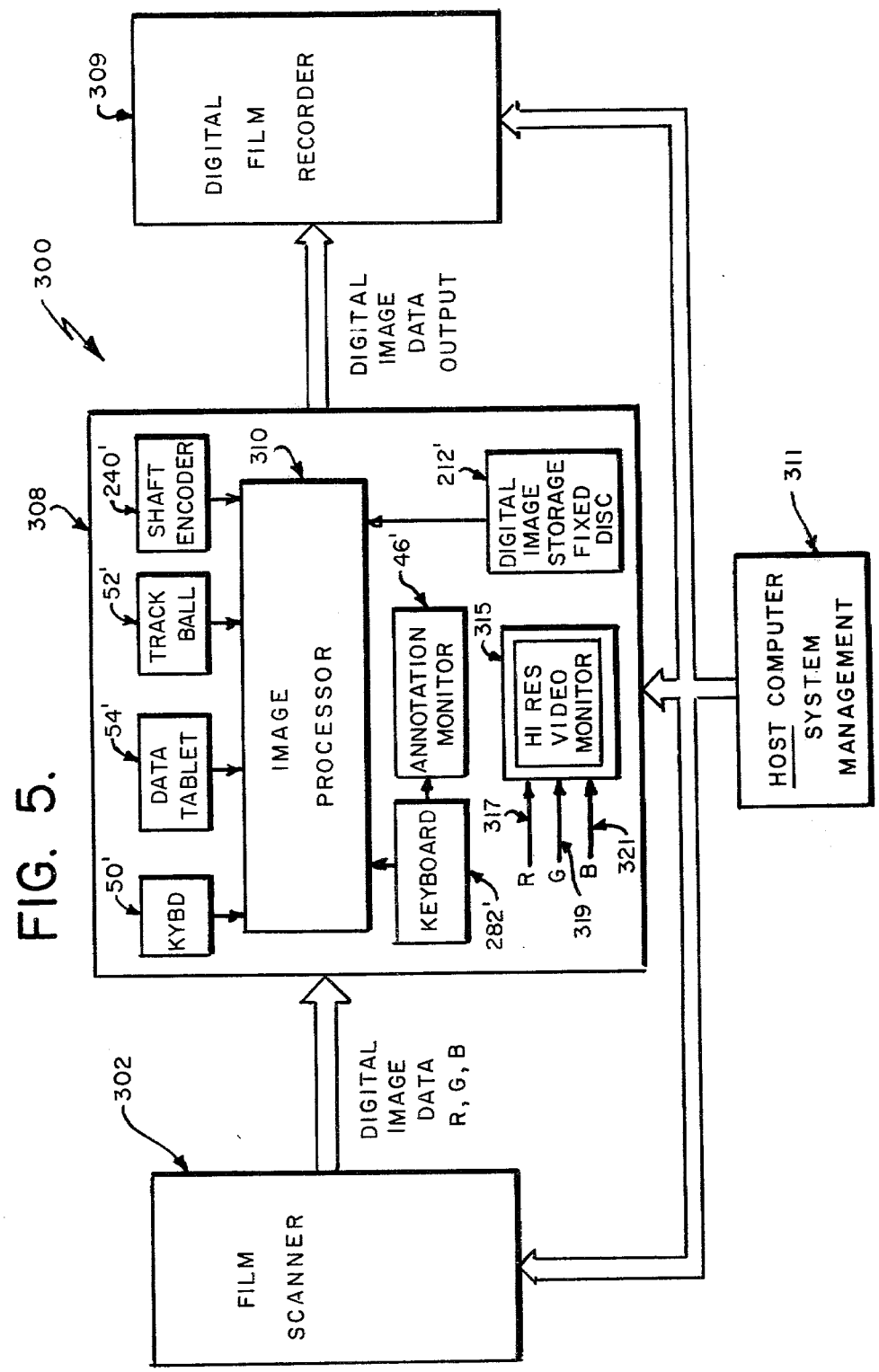
FIG. 5 is a block diagram, similar to FIG. 3, of the interactive film printing system of the present invention.
Figure 6:
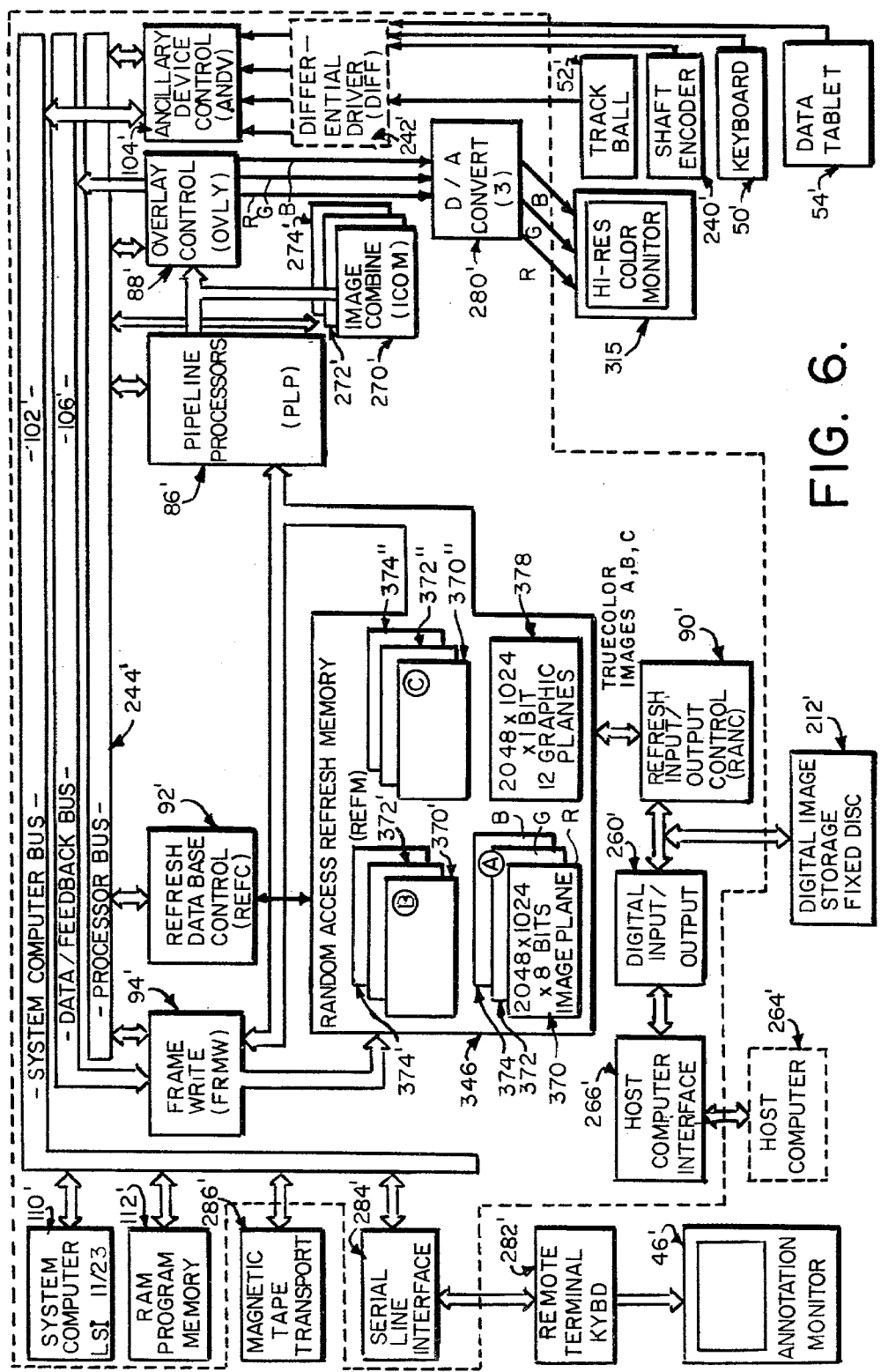
FIG. 6 is a block diagram, similar to FIG. 4, of the digital image processing portion of the system of FIG. 5.

Referring now to FIGS. 5 and 6, the presently preferred interactive film printing system of the present invention, generally referred to by the reference numeral 300, shall now be described. As shown and preferred, the interactive film printing system 300 includes a film scanner 302, such as one commercially available from CELCO or OPTRONICS as its C-4100HS, capable of providing RGB digital image data formatted in three separate image planes from film, such as 35 MM film; a digital image processor portion 308, which is essentially similar in function and operation to the previously described digital video image processor portion 208 of the system 200 of FIGS. 3 and 4 with the exception that processor portion 308 is adapted for processing digital film images whereas processor portion 208 is adapted for processing digital video images; and a digital film recorder 309, such as one commercially available from CELCO as its CFR 4000, or from DI-COMED as its D-148C, capable of recording a conventional film picture image from a digital image data input. The system 300 also includes a conventionally programmed host computer 311, such as DEC PDP 11/34, which does system management and controls the image data transfer between the various devices. The same convention employed with respect to the description of the system 200 of FIGS. 3 and 4 shall be employed with respect to the system 300 of FIGS. 5 and 6; i.e., identically functioning components to those previously described herein with respect to system 10 or system 200 will be given the same reference numeral herein followed by the prime "'" symbol.

As further shown and preferred in FIG. 5, and as will be described in greater detail with respect to FIG. 6, the digital image processing portion 308 of the film printing system 300 of the present invention includes an image processor 310, keyboard 50', data tablet 54', track ball 52', shaft encoder 240', digital image storage fixed disc 212', keyboard 282'-annotation monitor 46', and a high resolution color video monitor 315, such as one having a 1024-by-1024 resolution, for monitoring the RGB outputs 317, 319, 321 of the system 300.

Referring now to FIG. 6, the image processor 310 of the present invention which enables pixel-by-pixel image combination and color processing of film images in substantially the same manner as processor 210 of video system 200 shall now be described. Initially, it should be noted that the resolution of the system 300 is preferably 2048 by 1024 with variable aspect ratios and associated resolutions to accomodate the various film types capable of being employed with the system 300. For example, for 35 MM film, an 1850 by 1000 resolution may be employed to accomodate the 1.85:1 aspect ratio of 35 MM film. As shown and preferred in FIG. 6, the image processor 310 and associated devices, are substantially the same as for image processor 210 with the exception that there are no video cards 80'-82'-84', 80"-82"-84" and their associated pipeline processors, there is no television sync card 250 or master sync generator 224, there are no analog video inputs, and the refresh memory 346 which functions in the same manner as refresh memory 246 has three sets of 2048 by 1024 by 8 bit RGB image planes 370-372-374, 370'-372'-374', 370"-372"-374" and up to twelve 2048 by 1024 by 1 bit graphic planes 378, as opposed to the 1024 by 512 by 8 bit image planes and 1024 by 512 by 1 bit graphic planes or refresh memory 246. All of the various image processing components of the system 300 preferably also operate at the aforementioned 2048 by 1024 resolution and are under conventional software control to appropriately accomodate for changes in the aspect ratio.

With respect to the image processing of film images in the system 300 of the present invention, it is accomplished in essentially the same manner as the previously described frame-by-frame video image processing in the system 200 in that the two film images are scanned by one or more film scanners 302, conventionally converted to RGB digital images, and stored in two different sets of image planes, in the refresh memory 346. The RGB digital input is provided to the refresh memory 346 in the system 300 via the host computer 264', the digital input/output 260' and the refresh input/output control 90'. Thereafter, the two different stored images or portions thereof may be processed in the same manner as previously described with respect to such stored images or portions in the system 200. Thus, the film images in the system 300 may be processed with all of the various advantages obtainable with the video images in the system 200 with the exception of any of the real time interactive features associated with real time analog video. It should be noted that the high resolution color monitor 315 enables the processing of the film images to be contantly monitored in real time during such processing. When processing of a given frame has been completed, the processed frame in RGB digital format may be temporarily stored on the fixed disc 212' until it is decided to output that processed frame to the digital film recorder 304 for conversion back to film. It should be further noted that the frame or frames temporarily stored on the disc 212' can be further processed by being input back into the refresh memory 346.

By utilizing the improved video processing or film image printing systems of the present invention, multiple video or film images may be simultaneously combined and treated on a pixel-by-pixel basis without the necessity of NTSC encoding or decoding for video or the necessity, for both film and video, of being confined to the manner in which the original images were recorded.

What is claimed is:

1. An interactive image processing system capable of simultaneously processing a plurality of digitized composite color images to provide a displayable resultant composite color image therefrom, each of said digitized composite color images having separate digitized red, blue and green image components and having an associated image information content, said system comprising retrievable storage means for retrievably storing each of said digitized red, blue and green image components in separate image storage planes for at least two different composite color images; digital image processing means operatively connected to each of said image storage planes for enabling separate simultaneous interactive processing between each of said stored red, blue and green image components of said two different composite color images on a pixel-by-pixel basis in accordance with a defined aspect ratio for said resultant composite color image; interactive means operatively connected to said digital image processing means for enabling said simultaneous interactive controllable digital processing of the associated image information content of said two different digitized composite color images on said pixel-by-pixel basis; and means operatively connected to said image processing means for providing an output signal corresponding to said resultant color image.

2. An interactive image processing system in accordance with claim 1 wherein said retrievable storage means further comprises at least three other separate image storage planes capable of separately storing digitized image dates, said digital image processing means being further operatively connected to each of said three other separate image storage planes for further enabling said simultaneous interactive image processing.

3. An interactive image processing system in accordance with claim 2 wherein said three other separate image storage planes comprise red, blue and green image storage planes, respectively, operatively connected to said output signal providing means for retrievably storing the digitized red, blue and green image components of said resultant color image for enabling further simultaneous image processing thereof by said image processing means for providing iterative processing of said resultant color image.

4. An interactive image processing system in accordance with claim 3 wherein siad digital image processing means further comprises means for combining each of said red, blue and green image components of said two different color images on a pixel-by-pixel basis in accordance with a combining format.

5. An interactive image processing system in accordance with claim 4 wherein said retreivable storage means further comprises a graphic plane storage means for retrievably storing graphic control information for said simultaneous pixel-by-pixel processing of said two different composite color images, said graphic storage means comprising a separate single graphic storage plane for each of said two different composite color images, each of said single graphic storage planes retrievably storing said graphic control information for each of said red, blue nad green image components of one of said two different composite color images, said digital image processing means being further operatively connected to each of said graphic storage planes.

6. An interactive image processing system in accordance with claim 5 wherein said interactive means comprises means for providing said graphic control information to said graphic storage means for interactively controlling said simultaneous pixel-by-pixel processing in accordance therewith, said combining means being capable of varying said combining format on a pixel-by-pixel basis in accordance with said graphic control information.

7. An interactive image processing system in accordance with claim 6 wherein said system further comprises means operatively connected to said output signal for converting said output signal to a displayable color video signal for enabling monitoring of said image processing during said processing.

8. In accordance with claim 1 wherein said digital image processing means further comprises means for combining each of said red, blue and green image components of said two different color images on a pixel-by-pixel basis, in accordance with a combining format.

9. In accordance with claim 8 wherein said retreivable storage means further comprises a graphic plane storage means for retrievably storing graphic control information for said simultaneous pixel-by-pixel processing of said two different composite color images, said graphic storage means comprising a separate single graphic storage plane for each of said two different composite color images, each of said single graphic storage planes retrievably storing said graphic control information for each of said red, blue and green image components of one of said two different composite color images, said digital image processing means being further operatively connected to each of said graphic storage planes.

10. In accordance with claim 9 wherein said interactive means comprises means for providing said graphic control information to send graphic storage means for interactively controlling said simultaneous pixel-by-pixel processing in accordance therewith, said combining means being capable of varying said combining format on a pixel-by-pixel basis in accordance with said graphic control information.

11. In accordance with claim 1 wherein said retreivable storage means further comprises a graphic plane storage means for retrievably storing graphic control information for said simultaneous pixel-by-pixel processing of said two different composite color images, said graphic storage means comprising a separate single graphic storage plane for each of said two different composite color images, each of said single graphic storage planes retrievably storing said graphic control information for each of said red, blue and green image components of one of said two different composite color images, said digital image processing means being further operatively connected to each of said graphic storage planes.

12. In accordance with claim 2 wherein said retreivable storage means further comprises a graphic plane storage means for retrievably storing graphic control information for said simultaneous pixel-by-pixel processing of said two different composite color images, said graphic storage means comprising a separate single graphic storage plane for each of said two different composite color images, each of said single graphic storage planes retrievably storing said graphic control information for each of said red, blue and green image composites of one of said two different composite color images, said digital image processing means being further operatively connected to each of said graphic storage planes.

13. In accordance with claim 2 wherein said digital image processing means further comprises means for combining each of said red, blue and green image components of said two different color images on a pixel-by-pixel basis, in accordance with a combining format.

14. In accordance with claim 13 wherein said retreivable storage means further comprises a graphic plane storage means for retrievably storing graphic control information for said simultaneous pixel-by-pixel processing of said two different composite color images, said graphic storage means comprising a separate single graphic storage plane for each of said two different composite color images, each of said single graphic storage planes retrievably storing said graphic control information for each of said red, blue and green image components of one of said two different composite color images, said digital image processing means being further operatively connected to each of said graphic storage planes.

15. In accordance with claim 14 wherein said interactive means comprises means for providing said graphic control information to said graphic storage means for interactively controlling said simultaneous pixel-by-pixel processing in accordance therewith, said combining means being capable of varying said combining format on a pixel-by-pixel basis in accordance with said graphic control information.

16. In accordance with claim 1 wherein said system further comprises means operatively connected to said output signal for converting said output signal to a displayable color video signal for enabling monitoring of said image processing during said processing.

17. In accordance with claim 2 wherein said system further comprises means operatively connected to said output signal for converting said output signal to a displayable color video signal for enabling monitoring of said image processing during said processing.

18. In accordance with claim 1 wherein said image processing system comprises a video image production system for providing a displayable resultant composite video signal said color images being color video images comprising color video signals, said red, blue and green component images comprising red, blue and green video components of said color video signal.

19. In accordance with claim 18 wherein said digital image processing means comprises means for enabling real time simultaneous interactive controllable digital processing of said associated video information content of said two different digitized color video signals.

20. In accordance with claim 19 wherein said digital image processing means further comprises means for combining each of said red, blue and green image components of said two different color images on a pixel-by-pixel basis in accordance with a combining format.

21. In accordance with claim 20 wherein said retrievable storage means further comprises a graphic plane storage means for retrivably storing graphic control information for said simultaneous pixel-by-pixel processing of said two different composite color images, said graphic storage means comprising a separate single graphic storage plane for each of said two different composite color images, each of said single graphic storage planes retrievably storing said graphic control information for each of said red, blue and green image components at one of said two different composite color images, said digital image processing means being further operatively connected to each of said graphic storage planes.

22. In accordance with claim 21 wherein said interactive means comprises means for providing said graphic control information to said graphic storage means for interactively controlling said simultaneous pixel-by-pixel processing in accordance therewith, said combining means being capable of varying said combining format on a pixel-by-pixel basis in accordance with said graphic control information.

23. In accordance with claim 22 wherein said graphic control information providing means comprises means for providing a digital control mask for each of said pixels for enabling said varying of said combining format on a pixel-by-pixel basis, whereby interactive chroma keying may be provided.

24. In accordance with claim 19 wherein said retrievable storage means further comprises at least three other separate image storage planes capable of separately storing digitized image data, said digital image processing means being further operatively connected to each of said three other separate image storage planes for further enabling said simultaneous interactive image processing.

25. In accordance with claim 24 wherein said three other separate image storage planes comprise red, blue and green image storage planes, respectively, operatively connected to said output signal providing means for retrievably storing the digitized red, blue and green image components of said resultant color image for enabling further simultaneous image processing thereof by said image processing means for providing iterative processing of said resultant color image.

26. In accordance with claim 18 wherein said system further comprises separate digitizers for each of said red, blue and green video components for each of said two different color video signals, said digitizers being operatively connected to said digital image processing means for receiving the corresponding analog red, blue and green video component signals and for providing said digitized red, blue and green components therefrom directly to said processing means for enabling said simultaneous interactive processing thereof.

27. In accordance with claim 1 wherein said image processing system comprises a film printing system for providing a resultant composite film color image, said digitized composite color images comprising digitized color film images, whereby pixel-by-pixel digital processing of said associated film image information content of said two different digitized composite color film images may be accomplished.

28. In accordance with claim 27 wherein said system further comprises means operatively connected to said output signal for converting said output signal to a displayable color video signal for enabling monitoring of said image processing during said processing.

29. In accordance with claim 27 wherein said retrievable storage means further comprises at least three other separate image storage planes capable of separately storing digitized image data, said digital image processing means being further operatively connected to each of said three other separate image storage planes for further enabling said simultaneous interactive image processing.

30. In accordance with claim 29 wherein said three other separate image storage planes comprise red, blue and green image storage planes, respectively, operatively connected to said output signal providing means for retrievably storing the digitized red, blue and green image components of said resultant color image for enabling further simultaneous image processing thereof by said image processing means for providing iterative processing of said resultant color image.

31. In accordance with claim 29 wherein said digital image processing means further comprises means for combining each of said red, blue and green image components of said two different color images on a pixel-by-pixel basis in accordance with a combining format.

32. In accordance with claim 31 wherein said retrievable storage means further comprises a graphic plane storage means for retrievably storing graphic control information for said simultaneous pixel-by-pixel processing of said two different composite color images said graphic storage means comprising a separate single graphic storage plane for each of said two different composite color images, each of said single graphic storage planes retrievably storing said graphic control information for each of said red, blue and green image components of one of said two different composite color images, said digital image processing means being further operatively connected to each of said graphic storage planes.

33. In accordance with claim 32 wherein said interactive means comprises means for providing said graphic control information to said graphic storage means for interactively controlling said simultaneous pixel-by-pixel processing in accordance therewith, said combining means being capable of varying said combining format on a pixel-by-pixel basis in accordance with said graphic control information.

34. A method of interactively simultaneously processing a plurality of different composite color film images to provide a displayable resultant composite color film image print therefrom, said method comprising the steps of digitizing said composite color film images, each of said digitized composite color images having separate digitized red, blue and green image components and having an associated image information content; retrievably storing each of said digitized red, blue and green film image components in separate image storage planes for at least two different composite color film images; digitally processing the image contents of each of said image storage planes by controllable separate simultaneous interactive digital processing between each of said stored red, blue and green film image components of said two different composite color film images on a pixel-by-pixel basis in accordance with a defined aspect ratio for said resultant composite color film image for processing the associated film image information contents of said two different digitized composite color film images on said pixel-by-pixel basis; and providing an output signal corresponding to said resultant composite color film image print.

35. A method in accordance with claim 34 further comprising the step of converting said output signal to a color video signal for video monitoring of said image processing during said processing.

36. A method in accordance with claim 35 further comprising the step of providing said resultant color film image print from said output signal.

37. A method in accordance with claim 34 further comprising the step of providing said resultant color film image print from said output signal.

* * * * *